United States Patent

McKinney

[11] Patent Number: 5,785,854
[45] Date of Patent: Jul. 28, 1998

[54] CURRENT AND AERATION SYSTEM FOR WASTEWATER PLANT

[76] Inventor: Jerry McKinney, P.O. Box 9337, Beaumont, Tex. 77709

[21] Appl. No.: 892,681

[22] Filed: Jul. 14, 1997

[51] Int. Cl.$^6$ .................................................. C02F 3/20
[52] U.S. Cl. .................... 210/620; 210/758; 210/197; 210/202; 210/220
[58] Field of Search ........................... 210/620, 621, 210/627, 628, 758, 195.1, 197, 199, 202, 207, 220, 205, 221.2

[56] References Cited

U.S. PATENT DOCUMENTS

| | | | |
|---|---|---|---|
| 4,160,723 | 7/1979 | Kovacs | 210/199 |
| 4,337,152 | 6/1982 | Lynch | 210/197 |
| 4,650,577 | 3/1987 | Hansel | 210/195.3 |
| 4,664,795 | 5/1987 | Stegall et al. | 210/202 |
| 4,834,879 | 5/1989 | Stegall et al. | 210/205 |
| 5,221,470 | 6/1993 | McKinney | 210/151 |
| 5,254,246 | 10/1993 | Rivell et al. | 210/202 |
| 5,266,239 | 11/1993 | Drewery | 261/64.3 |
| 5,490,935 | 2/1996 | Guy | 210/620 |

OTHER PUBLICATIONS

Nayadic Wastewater Treatment Systems Brochure, 2-sided sheet showing wastewater plant.

Primary Examiner—Thomas G. Wyse
Attorney, Agent, or Firm—Vaden, Eickenroht & Thompson, L.L.P.

[57] ABSTRACT

A defined current and aeration system for the aeration chamber of an aerobic wastewater treatment plant is disclosed. It includes the release of oxygenation gas or air into the aeration chamber through a diffuser or the like at a position such that the air injected into the tank provides the necessary amount of oxygen for aerobic bacterial digestion of the waste while creating a current or circulation pattern in the chamber that forces every portion of the fluid within the aeration chamber into circulation thus preventing the accumulation of solids as sludge in the wastewater treatment plant.

10 Claims, 3 Drawing Sheets

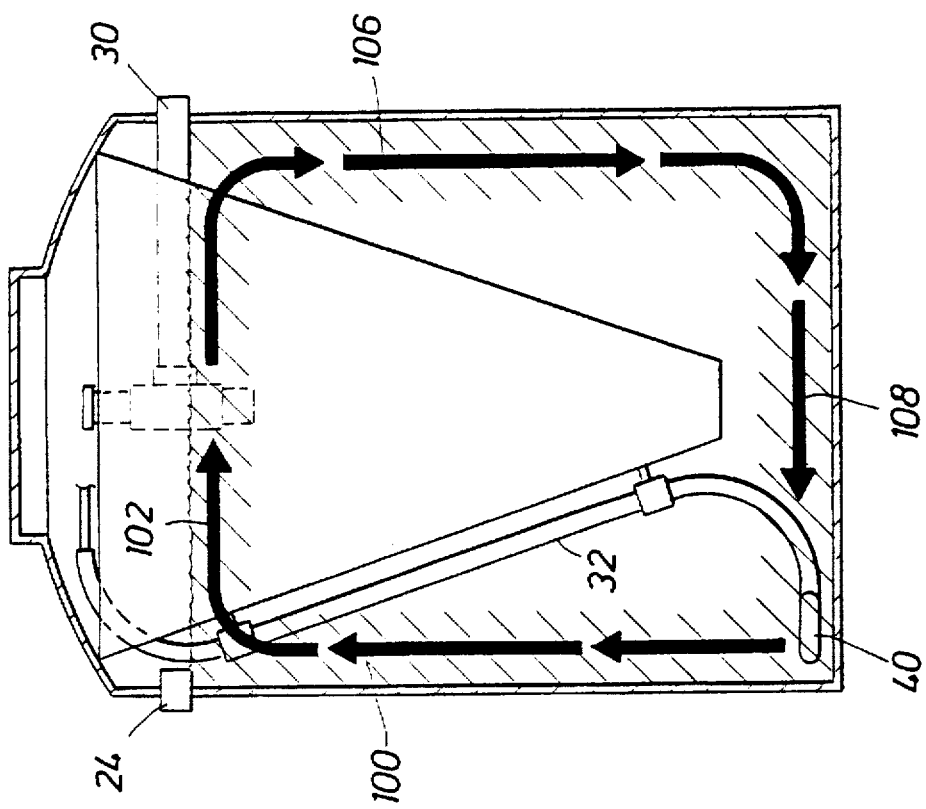
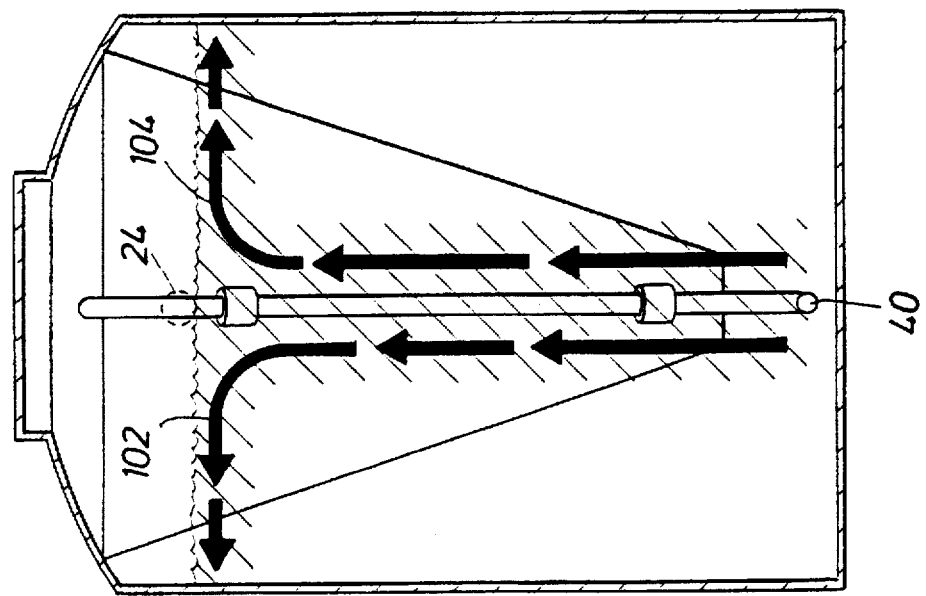

CURRENT AND AERATION SYSTEM FOR WASTEWATER PLANT

BACKGROUND OF THE INVENTION

This invention relates to an improved system for supplying air to the aeration chamber of an aerobic wastewater treatment plant.

In remote areas, newly developed subdivisions, or other locations where a municipal sewer system is not available, small anaerobic or aerobic wastewater treatment plants are used to handle the wastewater produced. Septic tanks use anaerobic bacteria to convert the organic solid waste in the wastewater stream. Usually, however, most of the organic solids settle as sludge to the bottom of the septic tank and must be pumped out periodically.

Aerobic wastewater treatment plants use "extended aeration" to efficiently encourage aerobic bacteria growth. Extended aeration includes contacting the wastewater with a large number of small bubbles of oxygen-carrying gas, thus maximizing the surface area for oxygen transfer. Air or oxygen is generally pumped into the tank through diffusers that break up the air into thousands of tiny air bubbles. Aerobic bacteria in the water convert waste products to water and $CO_2$, thus purifying the water and reducing the wastewater to a clear odorless liquid. Through extended aeration, the home wastewater treatment plants accelerates the reduction of waste substantially beyond the rate of reduction which can be accomplished with an anaerobic septic tank or even the rate of reduction observed in nature.

One problem associated with aerobic wastewater treatment plants is the failure of the flow of air in the aeration chamber to keep some of the solids from continuously settling to the bottom, where they build up a layer of sludge in the aeration and clarifier chamber, requiring periodic removal. It is desirable that a minimum of sludge removal be required since, in addition to the high maintenance requirement, disposal of the sludge presents an ecological problem. An accumulation of sludge within the unit further results in a deterioration of the wastewater treatment process because the high concentration of bacteria in the sludge rapidly consumes the available oxygen in the immediately surrounding water, whereupon, the bacteria begins to break down nitrogen compounds in the sludge to release bonded oxygen. This results in a release of nitrogen gas, which rises to the surface producing scum and disrupting the bacterial conversion. Thus, bacteria and waste need be maintained in solution for optimum conversion.

The basic aerobic wastewater treatment plant for home use includes a tank which is buried in the ground except for the top opening which provides access to the inside of the tank. The tank is divided into an aeration chamber into which the wastewater flows, where oxygen is supplied to cause aerobic bacteria to digest the solids in the wastewater, and a clarifier chamber from which the treated wastewater exits the treatment plant. An external oxygen source is generally connected to a PVC line which drops through the top portion of the tank to the bottom of the tank in the aeration chamber.

There are two basic designs of these treatment plants known in the art which are devised to retain solids in the aeration chamber until they can be broken down by bacteria. The first design includes two substantially rectangular chambers separated by a baffle or partition extending from the top of the plant a substantial length down through the plant. Wastewater must flow under this baffle to reach the clarifier chamber. A deflector directing errant solids out of the clarifier chamber back into the aeration chamber is a frequent element in this type of plant.

The second basic design of treatment plants includes a partition that is shaped like an inverted, truncated cone. This partition divides the tank into the two chambers, an outer aeration chamber and an inner clarifier chamber. This design may also incorporate a pyramid shaped deflector placed beneath the truncated conical partition to deflect solids settling out of the clarifier chamber back into the aeration chamber for further bacterial digestion.

Any solids remaining in the wastewater entering the clarifier chamber are expected to be converted by the bacteria in the clarifier chamber before the water reaches the outlet. Since this does not always happen, it is best to minimize the amount of solids reaching the clarifier chamber by efficiently exposing all solids in the aeration chamber to bacterial digestion and avoiding solid accumulation in the form of sludge.

Wastewater treatment plants of all shapes suffer from an accumulation of sludge in the tank. Sludge accumulates due to circulatory "dead spots" in the tank where the fluid does not flow. Dead spots may occur in corners of vessels due to the circulation pattern achieved in the vessel. Dead spots may also occur with the use of diffusers in two or more locations due to the interference pattern produced in the circulation or currents by the diffusers. It has been determined, that sludge tends to accumulate at the base of deflectors and, even worse, directly below the clarifier chamber. As discussed previously, sludge build-up results in the release of nitrogen gas. When the sludge is below the clarifier chamber, the nitrogen bubbles up into the clarifier chamber producing scum and interfering with the operation of the clarifier.

While the use of diffusers in multiple locations necessarily creates the problem of circulatory dead spots where sludge accumulates, this problem is accentuated since air entering into multiple lines is not emitted evenly. The air tends to come out more from one diffuser that the other, particularly if the tank is slightly tilted.

Current U.S. Pat. Nos. 4,664,795 and 4,834,879 by William A. Stegall et al issued May 12, 1987 and May 30, 1989 respectively, disclose the use of a diffuser in the rectangular-shaped treatment plant such that the placement of the diffuser opposite of the baffle and deflector set up a circular pattern in the aeration chamber specifically to avoid the migration of solids into the clarifier chamber. The drop line delivering air to the diffuser is placed directly below the inlet to the wastewater treatment plant and close to the bottom of the plant. The position of the diffuser creates a rolling pattern such that fluid carrying solids moves away from the opening of the clarifier chamber. Sludge build-up in low- or no-circulation zones is not addressed, but the circulation pattern as demonstrated in the drawing, while sweeping the bulk of the fluids into motion, does not sweep into the corners of the chamber. Presumably, this is where sludge build-up occurs.

U.S. Pat. No. 5,266,239 issued to T. Gig Drewery on Nov. 30, 1993, discusses the use of a wastewater treatment plant with an truncated, inverted conical partition having three drop lines for air, as shown in the drawings. The drop lines with diffusers for releasing air are spaced circumferentially and placed near the bottom of the plant. The diffusers create a current including three rolling patterns. The patent drawings show downwardly sweeping necessitated by the interference pattern of the neighboring diffusers. This creates multiple dead zones on the bottom of the aeration chamber.

3

With the use of multiple diffusers, one such dead zone is created directly beneath the clarifier chamber.

U.S. Pat. No. 5,221,470 from the current Applicant, Jerry L. McKinney, issued Jun. 22, 1993, discloses a treatment plant having an inverted truncated conical partition and a pyramidshaped deflector below. One of the inventions of this patent is the use of rigid conduits through which flexible air hoses extend to discharge air adjacent to the bottom of the aeration chamber. These rigid conduits are attached to the plant wall and extend vertically towards the bottom of the plant. The use of two diffusers creates interference patterns similar to those exhibited in the Drewery patent.

It is a feature of this invention to minimize or eliminate sludge build up in a wastewater treatment plant.

It is a further feature of this invention to create an improved current in a wastewater treatment plant that sweeps all solids into circulation to prevent solids from accumulating in a wastewater treatment plant.

It is a further feature of this invention to position an air diffuser in a single location in the aeration chamber of a wastewater treatment plant to create currents in the wastewater in the tank that will maintain all solids in circulation with the wastewater.

These and other objects, advantages, and features of this invention will be apparent to those skilled in the art from a consideration of this specification including the attached drawings and appended claims.

BRIEF SUMMARY OF THE INVENTION

The introduction of diffused oxygenation gas or air in a single location close to the bottom and the side wall of an aeration chamber produces a defined current or circulation pattern which generally maintains all solids in circulation and forces all fluid within a wastewater treatment plant into motion, overcoming dead spots created by interference patterns when two or more diffuser locations are used. The diffuser location close to the side wall and the bottom of the aeration chamber of the wastewater treatment plant forces a specific current or pattern of circulation which sweeps fluid from every portion of the plant such that solids will remain well mixed in solution instead of accumulating as sludge. This exposes all solids to efficient digestion by aerobic bacteria. In a preferred embodiment, an external oxygenation gas source supplies oxygenation gas, preferably air, through a flexible drop line or air line to the diffuser for release into the aeration chamber. The release of oxygenation gas at the diffuser location forces the defined current pattern in the tank while providing a sufficient supply of oxygen for the growth of the aerobic bacteria which digests the organic solid wastes. While the diffuser location can be a single location close to the side wall and near the bottom of the wastewater treatment plant, a preferred embodiment includes placing the diffuser close to the side wall and close to the bottom such that the diffuser is substantially below the wastewater treatment plant inlet. When multiple air lines and diffusers must be used to provide sufficient quantities of oxygen, a preferred embodiment includes grouping all drop lines and diffusers in close proximity below the wastewater treatment plant inlet.

A preferred embodiment of the current invention includes the use of an aerobic wastewater treatment plant with an inverted truncated conical partition dividing the aeration chamber from the clarifier chamber. A preferred embodiment uses no deflector under the clarifier chamber. The diffuser forces a pattern of circulation which produces exposure to oxygen to all fluid in the aeration chamber as shown in FIG. 4 and minimizes the formation and depositing of sludge on the bottom of the plant.

BRIEF DESCRIPTION OF THE DRAWING

FIG. 6 is an elevation view of the air released from the diffuser forcing the wastewater into the defined current or circulation pattern.

FIG. 7 is a 90 degree elevation demonstrating, as in FIG. 6, the air released from the diffuser forcing the wastewater into the defined current or circulation pattern.

Figure 2:
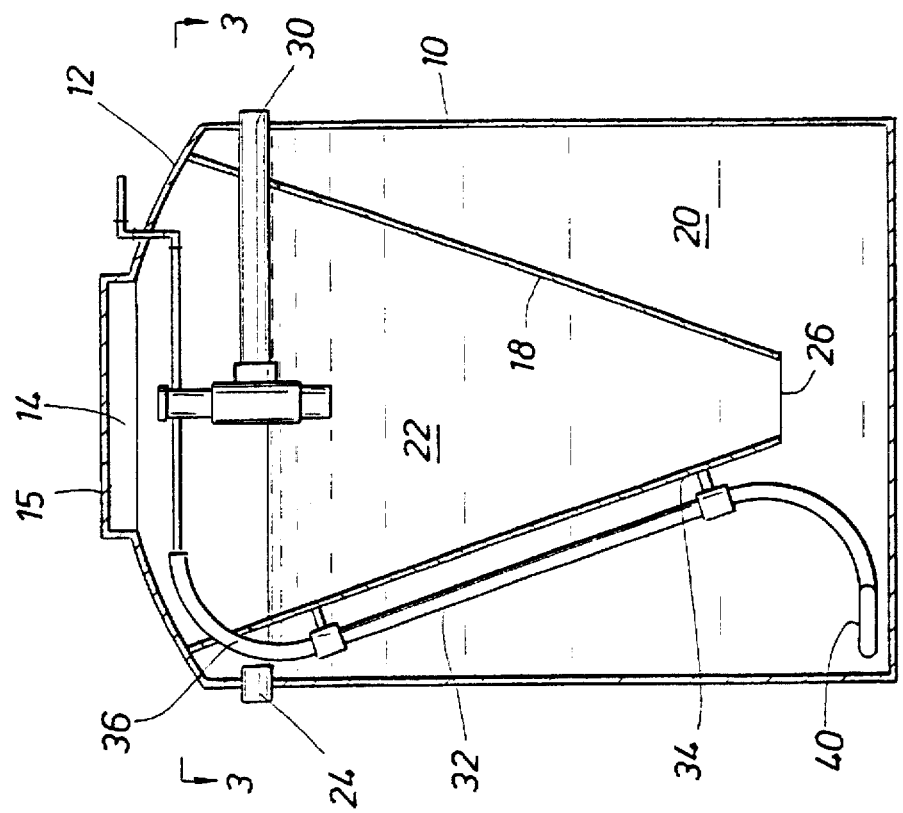
FIG. 2 is a vertical sectional view through a preferred embodiment of the treatment plant of this invention.

So that the manner in which the above recited features, advantages, and objectives of this invention, as well as others which will become apparent, are attained and can be understood in detail, more particular description of the invention briefly summarized above may be had by reference to the embodiments thereof which are illustrated in the drawings, which drawings form a part of the specification. It is to be noted, however, that the appended drawings illustrate only preferred embodiments of the invention and are, therefore, not to be considered limiting of the invention's scope, for the invention may admit to other equally effective embodiments.

DETAILED DESCRIPTION OF THE INVENTION

The water treatment plant of a preferred embodiment shown in the drawings includes cylindrical tank 10 with dome-shaped upper end 12. Opening 14 is located in the upper end to provide access to the inside of the tank. Usually, the tank is buried in the ground so that only opening 14 and its cover 15 are above ground.

Inside the tank is partition 18 that is shaped like an inverted, truncated, cone. The upper end of the partition is attached to dome-shaped upper end 12. This partition divides the tank into two chambers, aeration chamber 20 and clarifier chamber 22.

In operation, wastewater from the residence or facility to which the plant is connected enters the aeration chamber through inlet 24. Flow through the plant is a result of hydrostatic pressure. The water entering inlet 24 will increase the hydrostatic head in aeration chamber 20 causing water to flow into opening 26 in the bottom of the clarifier chamber. This causes the water in the clarifier chamber to move upwardly and exit through outlet pipe 30.

Figure 3:
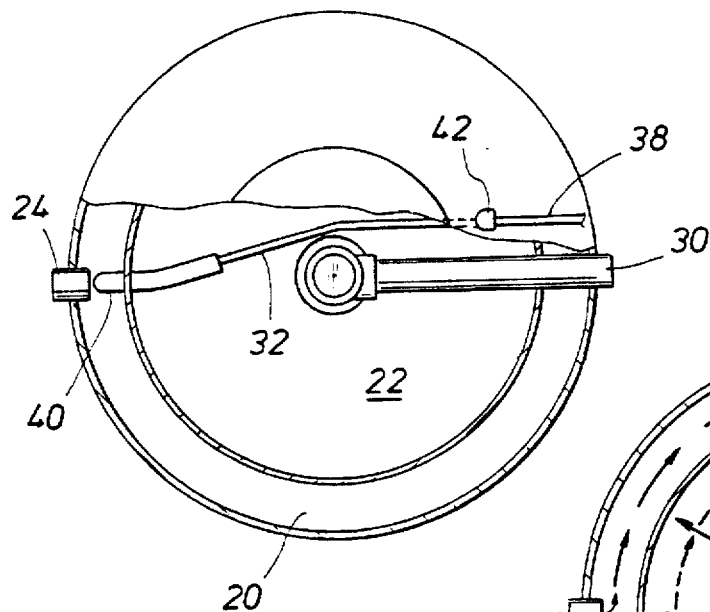
FIG. 3 is a sectional view taken along line 3—3 of FIG. 2 showing a single air line connected to a diffuser.
Figure 4:
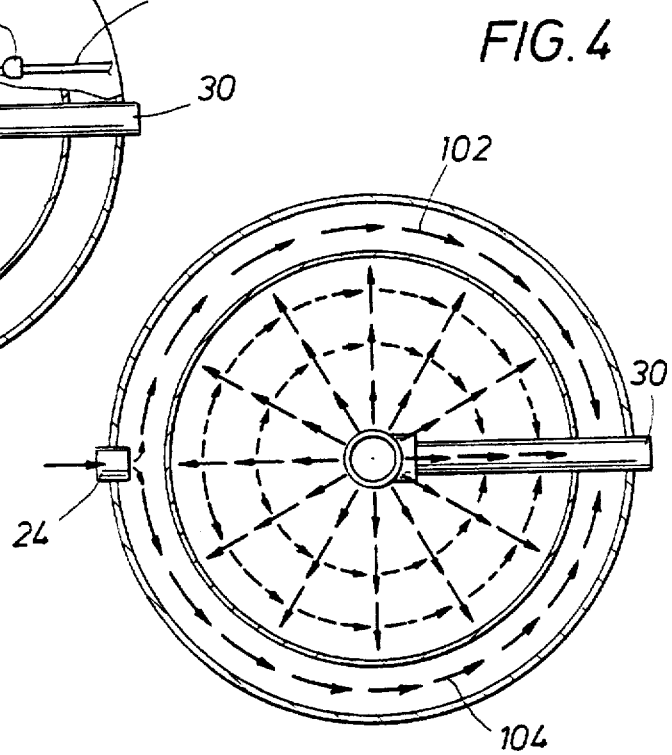
FIG. 4 is a plan view of the current or circulation pattern established within the wastewater treatment plant of a preferred embodiment.

In a preferred embodiment of the current invention, air or other oxygenation gas is supplied to aeration chamber 20 through flexible drop line 38 connected to diffuser 40 supported by rigid conduit 32. Rigid conduit 32 is mounted on partition 18 which defines clarifier chamber 22 and the rigid conduit extends downwardly into aeration chamber 20 to a position close to the bottom of the chamber and close to side wall 50. This conduit is supported by conduit brackets 34 and is held in the position shown by the conduit brackets and openings 36 in partition 18 through which the conduit extends downwardly into the aeration chamber as shown in FIG. 3. Positioned in rigid conduit 32 is flexible drop line 38 through which air is supplied to diffuser 40 connected to the end of the flexible drop line.

In the embodiment shown in FIG. 3, one flexible drop line is shown delivering air to aeration chamber 20. Air is supplied to the flexible drop line from the external oxygenation source, preferably an air compressor.

Figure 1:
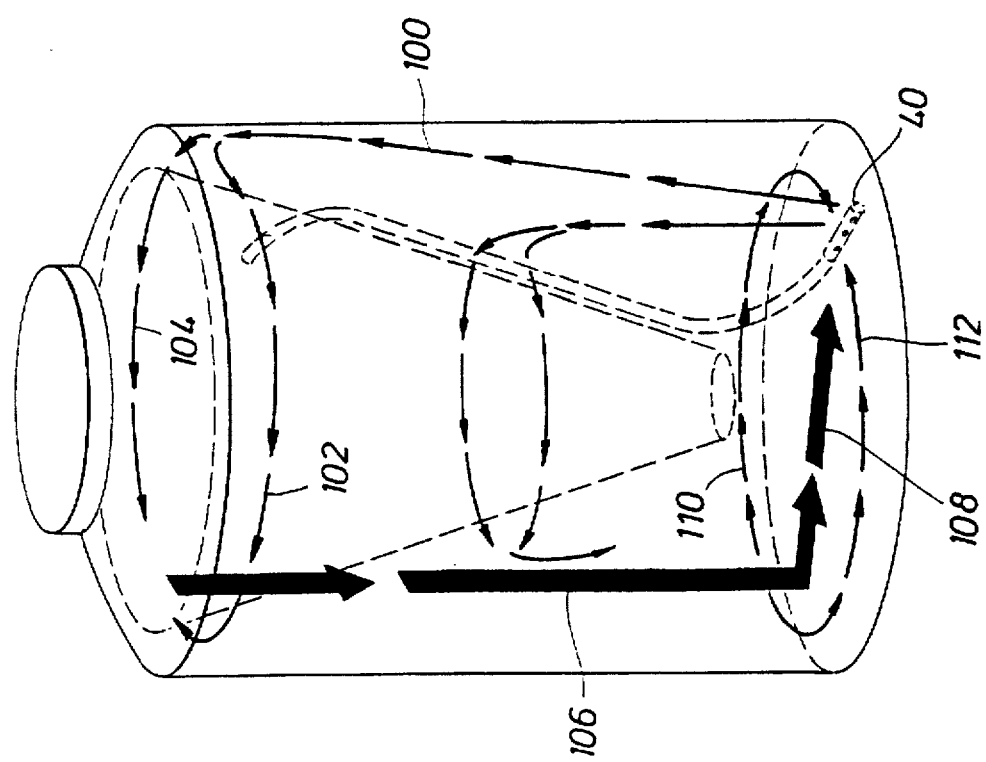
FIG. 1 is an isometric view demonstrating the complete current or circulation pattern established within the wastewater treatment plant of a preferred embodiment.
Figure 5:
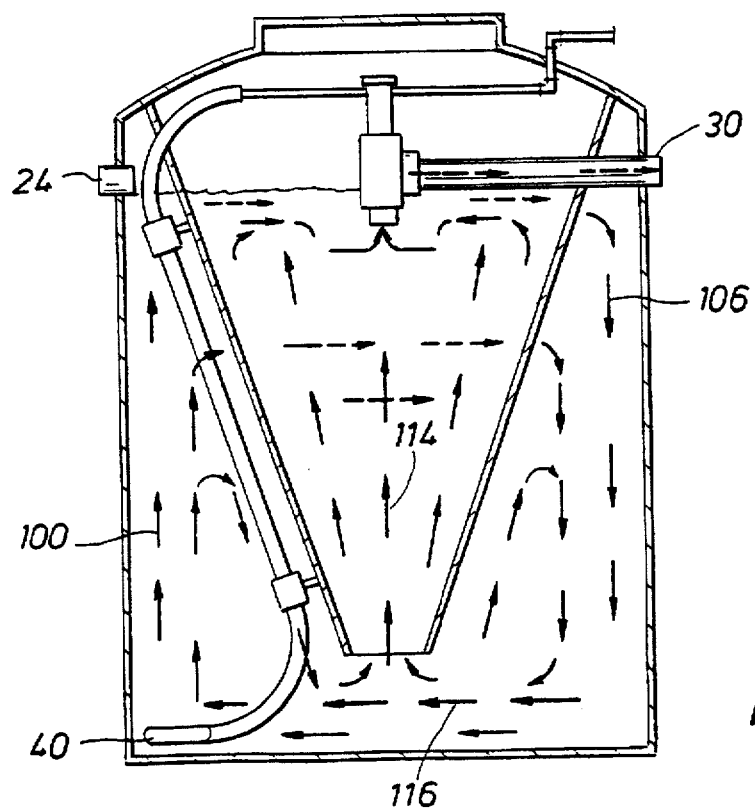
FIG. 5 is an elevation view of the current or circulation pattern established within the wastewater treatment plant of a preferred embodiment.

The defined current or circulation pattern produced by this embodiment, as shown in FIG. 1, is such that oxygenation gas forces the fluid within the aeration chamber to move upwards in direction 100 from the diffuser until it reaches the surface of the liquid within the chamber. This forces a current which travels around the conical partition in both direction, as indicated by the numbers 102 and 104. As these currents meet on the opposite side of the partition, the intersection of the outer currents cause a downwardly flowing current 106 which flows to the bottom of the aeration chamber which creates main currents 108, 110, and 112 that sweep across the bottom in all directions. The water sweeping generally in a straight line across the bottom of the vessel in direction 108 moves with the greatest speed and serves to move any solid falling out of clarifier chamber back into circulation in the aeration chamber, thus preventing any accumulation of solids in the bottom of the aeration chamber. The water moving generally around the outer perimeter of the vessel in directions 110 and 112 moves at a slower speed but with enough speed to scour the edges of the vessel and to sweep the solids into circulation. All areas of the bottom of the vessel are forced into circulation. Those areas intermediate between the path straight across the bottom of the vessel and the path around the outer perimeter travel at respectively intermediate speeds. While FIG. 1 shows the entire circulation pattern, FIG. 5–7 show different views of parts of this pattern.

While the wastewater in the aeration chamber is thus forced into circulation, the clarifier chamber remains largely undisturbed. Fluid rises in the clarifier chamber in direction 114 as a result of hydrostatic head. The defined current produced by the introduction of oxygenated gas, flows across the opening of the inverted, truncated cone defining the clarifier chamber in direction 116 but does not flow into the clarifier chamber. Thus the clarifier chamber has reduced turbulence, while the aeration chamber bacteria effectively digest the solid particles from the wastewater. Treated wastewater rises through the clarifier chamber and exits the plant through an outlet pipe.

The diffuser is located close to the bottom of the plant, preferably within 3 to 4 inches from the bottom, and close to the side wall of the tank in order to produce the desired current. Placing the diffuser closer to the center causes the air to hit the conical partition, thus changing the pattern. Such placement also causes the tiny bubble to coalesce into larger bubbles along the partition, thus reducing the aeration effect. If the diffuser is placed too far above the bottom of the tank, then sludge will accumulate beneath the diffuser on the bottom of the tank.

Experimentation was conducted on a base case of a 850 gallon tank using one air diffuser at [x] psig and [y] flow rate. The current pattern described above was observed. The current sweeps up the side wall above the diffuser in direction 100, around the partition in directions 102 and 104, down the opposite side wall in direction 106, and across the bottom in directions 108, 110, and 112. It can be observed that the flow turns below the truncated conical partition creating slight suction which pulls solids out of the bottom of the clarifier chamber by this action. Thus, the defined current not only mixes the solids and water for maximum digestion of the waste such that fewer particles are available to enter the clarifier chamber, but the current also serves to pull solids out of the bottom of the clarifier chamber for further digestion in the aeration chamber.

When a diffuser plugs up or for whatever reason a drop line needs to be removed for repair or replacement, the drop line is discovered from the external oxygenation gas source, such as an air compressor, and simply pulled out of the rigid conduit in which it is located and out of the tank through opening 14. The new or repaired hose and diffuser can then be threaded back through the rigid conduit and reconnected to the air compressor.

Another preferred embodiment includes the use of multiple diffusers all of which are placed generally below the inlet to the wastewater tank close to the bottom. This allows the introduction of a higher volume of oxygenation gas while creating the circulation or current pattern of the invention. To equalize the pressure between the multiple diffusers, a pressure regulator such as a choke valve can be utilized. This assures an equal amount of oxygenation gas flowing to each diffuser.

Another preferred embodiment includes releasing the oxygenation gas through a diffuser located close to the bottom and close to the side wall of the wastewater treatment plant by delivering oxygenation gas directly through the bottom or side of the wastewater treatment plant into the aeration chamber.

From the foregoing it will be seen that this invention is one well adapted to attain all of the ends and objects hereinabove set forth, together with other advantages which are obvious and which are inherent to the apparatus and structure.

Because many possible embodiments may be made of the invention without departing from the scope thereof, it is to be understood that all matter herein set forth or shown in the accompanying drawings is to be interpreted as illustrative and not in a limiting sense.

For example, oxygenation gas can be delivered in many ways to the diffuser location close to the bottom and the side wall of the aeration chamber of the wastewater treatment plant. In addition to the drop lines, aeration pipes or the like can be used. The release of the oxygenation gas to create the circulation pattern of this invention encompasses all such deliveries.

Likewise, while a diffuser is used to release the oxygenation gas or air so as to encourage bacteria growth and to force the circulation, other emitters or components can be used to produce this desired effect. By releasing the oxygenation gas in such an amount and at such a location as to create the circulation pattern of this invention, such substitute components are encompassed within this invention.

The above examples are illustrative and are to be understood as non-limiting as to the scope of the invention.

What is claimed is:

1. In an aerobic wastewater treatment plant comprising:
    an aeration chamber containing aerobic bacteria into which wastewater containing organic solids flows to be exposed to aerobic bacteria to convert the organic solids in the wastewater to water and $CO_2$, said aeration chamber having a bottom and side walls,
    means for injecting an oxygenation gas into the wastewater in the aeration chamber to support growth of the aerobic bacteria, and a clarifier chamber into which wastewater from the aeration chamber flows upwardly toward an outlet pipe through which the wastewater flows from the wastewater treatment plant, said clarifier chamber being defined by a partition in the form of an inverted, truncated cone into the bottom of which the wastewater flows from the aeration chamber, the improvement comprising a diffuser for releasing the oxygenation gas as bubbles into the aeration chamber of the wastewater treatment plant, said diffuser providing sufficient flow such that all solids suspended within the plant are forced into circulation, said diffuser being placed close to the bottom of the aeration chamber of the wastewater treatment plant and close to the side wall of the aeration chamber, said diffuser providing sufficient oxygenation gas to allow the aerobic bacteria to convert the wastewater into $CO_2$ and water.

2. The wastewater treatment plant of claim 1, wherein the wastewater treatment plant has a substantially flat bottom.

3. The wastewater treatment plant of claim 2, wherein the released oxygenation gas produces a current in the aeration chamber, the current flowing upwardly from a position of the diffuser in a direction perpendicular to the bottom of the aeration chamber and parallel to the side wall of the aeration chamber, then around the partition which defines the clarifier chamber, then downwardly along the opposite side wall to the bottom and then across the bottom under the opening to the clarifier chamber and around the side wall of the aeration chamber adjacent the bottom of the chamber to keep solids from settling on the bottom of the aeration chamber.

4. The wastewater treatment plant of claim 3 wherein said oxygenation gas injecting means further comprises a drop line having a first end attached to an external oxygenation source and a second end open to dispense oxygenation gas received from the external oxygenation gas source, said second end being attached to said diffuser.

5. The wastewater treatment plant of claim 4 wherein said oxygenation gas injecting means further comprises a rigid conduit mounted to the inside of the wastewater treatment plant for receiving and firmly securing the drop line such that the drop line extends from the oxygenation source towards the bottom of the plant.

6. The wastewater treatment plant of claim 5 wherein said rigid conduit extends generally parallel to the partition and from there generally to the bottom of the wastewater treatment plant such that the rigid conduit is intimately connected to the partition.

7. In an aerobic wastewater treatment plant comprising an aeration chamber into which the wastewater flows to be exposed to aerobic bacteria to convert the organic solids in the wastewater to water and $CO_2$, said aeration chamber having a bottom and side walls, means for injecting an oxygenation gas into the wastewater in the aeration chamber to support growth of the aerobic bacteria, and a clarifier chamber in which wastewater from the aeration chamber flows upwardly toward an outlet pipe through which the wastewater flows from the wastewater treatment plant, said clarifier chamber being defined by a partition in the form of an inverted, truncated cone into the bottom of which the wastewater flows from the aeration chamber, the improvement comprising a current in the aeration chamber, the current flowing upwardly from a position close to the bottom and the side wall of the aeration chamber in a direction perpendicular to the bottom of the aeration chamber and parallel to the side wall of the aeration chamber, then around the partition which defines the clarifier chamber, then downwardly along the opposite side wall to the bottom and then across the bottom under the opening to the clarifier chamber and around the side wall of the aeration chamber adjacent the bottom of the chamber to keep solids from settling on the bottom of the aeration chamber.

8. The method of creating a current inside an aeration chamber of a wastewater treatment plant, said aeration chamber having a bottom and side walls, comprising the step of injecting an oxygenation gas such that a current is produced in the aeration chamber, the current flowing upwardly from a position close to the bottom and side wall of the aeration chamber in a direction perpendicular to the bottom of the aeration chamber and parallel to the side wall of the aeration chamber, then around the partition which defines a clarifier chamber, then downwardly along the opposite side wall to the bottom and then across the bottom under an opening to the clarifier chamber and around the side wall of the aeration chamber adjacent the bottom of the aeration chamber to keep solids from settling on the bottom of the aeration chamber.

9. An aerobic wastewater treatment plant comprising:

an aeration chamber containing aerobic bacteria into which wastewater containing organic solids flows to be exposed to aerobic bacteria to convert the organic solids in the wastewater to water and $CO_2$, said aeration chamber having a bottom and side walls, means for injecting an oxygenation gas into the wastewater in the aeration chamber to support growth of the aerobic bacteria, a clarifier chamber into which wastewater from the aeration chamber flows upwardly toward an outlet pipe through which the wastewater flows from the wastewater treatment plant, said clarifier chamber being defined by a partition in the form of an inverted, truncated cone into the bottom of which the wastewater flows from the aeration chamber, a diffuser for releasing the oxygenation gas as bubbles into the aeration chamber of the wastewater treatment plant, said diffuser providing sufficient flow such that all solids suspended within the plant are forced into circulation, said diffuser being placed close to the bottom of the aeration chamber of the wastewater treatment plant and close to the side wall of the aeration chamber, said diffuser providing sufficient oxygenation gas to allow the aerobic bacteria to convert the wastewater into $CO_2$ and water.

10. An aerobic wastewater treatment plant comprising an aeration chamber into which the wastewater flows to be exposed to aerobic bacteria to convert the organic solids in the wastewater to water and $CO_2$, said aeration chamber having a bottom and side walls, means for injecting an oxygenation gas into the wastewater in the aeration chamber to support growth of the aerobic bacteria, a clarifier chamber in which wastewater from the aeration chamber flows upwardly toward an outlet pipe through which the wastewater flows from the wastewater treatment plant, said clarifier chamber being defined by a partition in the form of an inverted, truncated cone into the bottom of which the wastewater flows from the aeration chamber, and a current in the aeration chamber, the current flowing upwardly from a position close to the bottom and the side wall of the aeration chamber in a direction perpendicular to the bottom of the aeration chamber and parallel to the side wall of the aeration chamber, then around the partition which defines the clarifier chamber, then downwardly along the opposite side wall to the bottom and then across the bottom under the opening to the clarifier chamber and around the side wall of the aeration chamber adjacent the bottom of the chamber to keep solids from settling on the bottom of the aeration chamber.

* * * * *